United States Patent [19]

Pocapalia

[11] Patent Number: 5,139,102
[45] Date of Patent: Aug. 18, 1992

[54] TRAILER MANEUVERING DOLLY

[76] Inventor: Dan Pocapalia, 530 E. Wardlow Road, Long Beach, Calif. 90801

[21] Appl. No.: 381,211

[22] Filed: Jul. 17, 1989

[51] Int. Cl.$^5$ ............................................. B62D 51/04
[52] U.S. Cl. ................................. 180/19.2; 180/19.3; 280/DIG. 11; 254/93 R
[58] Field of Search ............... 180/11, 12, 16, 904, 180/19.1-19.; 280/DIG. 11, 476.1; 254/93 R, 93 L

[56] References Cited

U.S. PATENT DOCUMENTS

| 3,166,141 | 1/1965 | Shields et al. | 180/19.1 |
| 3,285,358 | 11/1966 | Neely | 180/11 |
| 3,370,666 | 2/1968 | Holtzclaw et al. | 180/26 |
| 3,819,001 | 6/1974 | Pavelka | 180/19 H |
| 3,865,204 | 2/1975 | Bueckner | 180/12 |
| 3,942,823 | 3/1976 | Shields et al. | 280/423 R |
| 4,210,217 | 7/1980 | Lachowicz | 180/13 |
| 4,605,086 | 8/1986 | Marom | 280/767 |
| 4,629,020 | 12/1986 | Thurman | 180/19.2 |
| 4,629,391 | 12/1986 | Soyk et al. | 414/563 |

FOREIGN PATENT DOCUMENTS 2193935 2/1988 United Kingdom .

OTHER PUBLICATIONS

Copies of the Cover Pages of the Cited U.S. Patents are Enclosed Complete Copy of U.K. Patent is Enclosed. A Prior Art Statement Or Information Disclosure Statement Pursuant to 37 CFR 1.98 Will Be Sent to the P.T.O. Later.

Primary Examiner—Charles A. Marmor
Assistant Examiner—Alan M. Kagen
Attorney, Agent, or Firm—Jessup, Beecher & Slehofer

[57] ABSTRACT

A self-propelled trailer maneuvering dolly for transporting a fifth wheel trailer or a travel trailer. The dolly has a frame, a front handlebar and castor for steering, a pair of rear drive wheels for driving the dolly, a pneumatic motor, and sprocket wheels and chains for transmitting power to the drive wheels. There is a pneumatically extensible and retractable vertical lift, which has a top for engaging with the coupling member of a fifth wheel trailer and it also has a hitch ball for hitching up to a convention travel trailer. A spring biased lift bracket below the frame keeps the drive wheels off the ground when the trailer is empty so that the operator can easily maneuver the dolly into position below the coupling member of a fifth wheel to be moved. A lever supplies pressurized air to the lift, which in turn raises the front end of the fifth wheel trailer. The weight of the trailer is centered on the dolly and also keeps the drive wheels on the ground. Another lever supplies pressurized air to slowly turn the drive wheels. The operator guides the dolly with the front handlebar. When transporting a travel trailer, the ball hitch is aligned with the tongue of the trailer to be moved. The two are fastened together, and the lift is raised to elevate the front end of the travel trailer off the ground. The operator can then maneuver the trailer to its new position.

14 Claims, 3 Drawing Sheets

TRAILER MANEUVERING DOLLY

BACKGROUND OF THE INVENTION

1. Field of the Invention

Motor vehicles special driving device steered by walking attendant who steerably controls steerable wheel; handle movement controls vehicle drive.

Wheeled land vehicles: articulated vehicles being of the pallet truck type; and further having vertically adjustable drive wheels attached to the platform.

2. Description of the Prior Art

Trailer maneuvering devices are well known in the art. They are used to transport within a confined area a travel trailer, a fifth wheel type of trailer, or the big rig semi-trailers used by commercial trucking companies. The typical trailer maneuvering device can be gasoline powered, hydraulically powered, or manually operable. They all have in common a support platform, a set of wheels attached to the platform to allow the device to roll on the pavement, and a front steering wheel which can be guided by the operator by some type of steering mechanism such as a lever or handle. The typical platform has a hitch ball assembly so that it can be hitched up with the tongue and sprocket, which is the front towing arm extending from the conventional travel trailer, in order to maneuver the trailer. The trailer maneuvering devices can either pull (tow) the trailer or push the trailer to maneuver and park, or dock the trailer at whatever destination is desired by the operator. In the self-contained and self-propelled trailer maneuvering devices, there is usually a gasoline powered engine, which in turn runs an hydraulic pump for providing hydraulic pressure to the lift mechanism and to provide power to the drive wheels of the trailer maneuvering device.

Thurman, U.S. Pat. No. 4,629,020, shows an example of a trailer maneuvering device for moving large semi-trailer tractor units and which has a scissors-like hydraulic ram for lifting a bearing sleeve trunnion for connection to a fifth wheel type of connection as found in large commercial vehicles.

Sheilds, U.S. Pat. No. 3,942,823, illustrates an example of a gasoline powered trailer maneuvering device which is manually steerable.

Soyk, U.S. Pat. No. 4,629,391, illustrates an example of a power lifter for moving a disabled vehicle from one location to another. It utilizes an hydraulic cylinder which has a telescoping mast. The cylinder is powered by an hydraulic pump, which is in turn rotated by an electric motor.

SUMMARY AND OPERATION OF THE INVENTION

A typical travel trailer is assembled along an assembly line in a manufacturing plant. During the assembly process, the components, which go into the construction of a trailer are stockpiled along the assembly line and are installed in a prearranged order. Various components include framing, plumbing, holding tanks, electrical wiring, cabinets, insulation, panelling, appliances, carpeting, drapes, seats, and cushions. The installers usually use air powered tools in the installation process. Such tools include a drill, stapler, riveter, hammer, and saw. The assembly line has a full array of air lines, or air hoses, available for easy snap on connection to the pneumatic tools used by the installers. During the installation proces, sawdust and remnants of flammable pieces of material accumulate. This potential fire hazard requires that sparks and other fire igniting sources be eliminated or kept to the minimum. As a result, electric or gasoline motors are usually prohibited along the assembly line. If one has a mechanized device to pull the trailer along the assembly line, the the device should preferably be air powered to reduce fire danger, and because of the ready availability of compressed air lines. Gasoline powered devices also contribute to air and noise pollution in the plant.

The present invention is a trailer maneuvering dolly for assisting the attendant/operator in transporting a fifth wheel trailer or a travel trailer. The dolly has a horizontal frame, a front handlebar and castor for steering the dolly, a pair of rear drive wheels for driving the dolly, a pneumatic motor, and sprocket wheels and interconnecting chains for transmitting power to the drive wheels. There is a pneumatically extensible and retractable vertical lift, which has a top for engaging with the coupling member of a fifth wheel trailer. The lift also has a hitch ball for hitching to a conventional travel trailer. A spring loaded lift bracket extending from below the frame elevates and maintains the back of the platform and the drive wheels off the pavement when the trailer dolly is empty so that the operator can easily maneuver the dolly into position and align it directly underneath the coupling member of a fifth wheel trailer to be moved. A hand actuated lever supplies pressurized air on demand to the lift, which in turn extends and raises the front end of the fifth wheel trailer. The weight of the trailer is centered on the dolly by means of the lift. After engagement with the trailer, the trailer's weight placed on the lift and dolly forces the raised rear drive wheels down onto the pavement for traction purposes. Another hand actuated lever supplies pressurized air on demand to the pneumatic motor causing the two drive wheels to turn very slowly because of gearing reduction via the drive train. The dolly slowly pulls the coupled trailer while the attendant/operator guides and walks with the dolly by steering with the front handlebar. The dolly can also travel in reverse to back up a trailer.

When transporting a conventional travel trailer, the ball hitch attached to the lift is aligned below the tongue and sprocket of the trailer to be moved. The lift is pneumatically raised sufficiently to place the hitch ball in the tongue of the trailer. The two are fastened together, and the lift is raised again to raise the front end of the travel trailer off the ground. The operator can then maneuver the trailer to its new position.

Expressed another way, the present invention is a selfpropelled trailer maneuvering dolly having a frame, two rear drive wheels and front castor. It is used to move a travel trailer along a grooved track on the assembly line as the unit is being manufactured at the plant, or to transport and dock an assembled unit at various locations in the plant.

Attached to the top surface area of the frame of the dolly is an upstanding vertically positioned optional air chamber combined with a vertically extensible and retractable pneumatic lift with a load supporting base at its upper end for coupling with the pivot point of the fifth wheel type of trailer and to raise or lower the front end of the trailer. There can be a pair of upright pneumatic pistons mounted longitudinally and side by side to the lift. They raise and lower the lift in response to the introduction of pressurized air. There is also a hitch ball for connecting to the sprocket and tongue of a conventional travel trailer. The dolly can also be used to move this type of trailer. There is an operator's handle and lever for forward and reverse commands, to operate the fifth wheel lift, to steer the dolly by turning the front castor, and to supply pressurized air to the dolly.

The dolly is pneumatically powered. The drive motor that turns the two drive wheels is powered by pressurized air. The lifting means to extend and retract the base, or pedestal, for the fifth wheel is also powered by pressurized air.

The power train comprises the air motor/sprocket wheel interconnected with an intermediate plate sprocket wheel by a continuous chain. The intermediate plate sprocket wheel is concentrically attached to a drive shaft and the flat face is perpendicular to the drive shaft. The drive shaft in turn is connected to the two drive wheels by separate tooth sprocket wheels and chains. The different diameters of the six sprocket wheels results in speed reduction to slowly power and turn the drive wheels.

There are two separate air hoses; one to the pneumatic lift, and the other one to the air motor. The flow of pressurized air can be regulated on demand by the operator to change the speed of the air motor, and also to raise and lower the powered lift. There is a spring biased lift bracket with castors positioned underneath the platform, which raises the drive wheels above the pavement when the dolly is empty. A T-bar handle allows the dolly to be manually maneuvered and pulled when empty without either of the drive wheels touching the pavement for ease in the maneuvering and docking of the empty dolly.

DETAILED DESCRIPTION OF THE INVENTION

Figure 5:
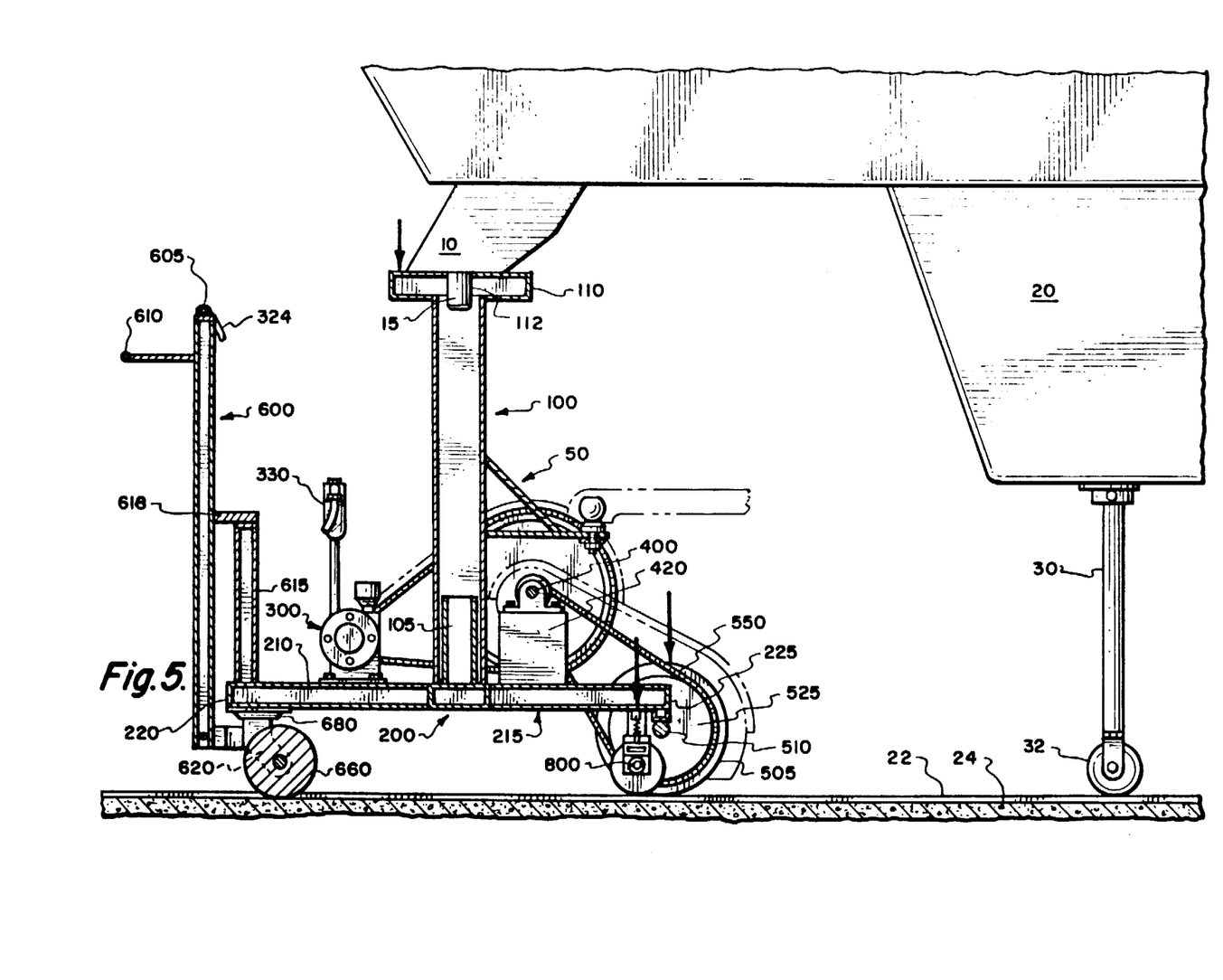
FIG. 5 is a longitudinal sectional view of the invention taken along the line 5—5 of FIG. 3 showing a portion of a fifth wheel trailer connected to the invention.

Referring now to FIG. 5, there is illustrated the vertical longitudinal sectional view of the invention having the coupling member 10 and pivot pin 15 of the fifth wheel trailer 20 resting on top of and coupled with the vertically extensible lift 100 and platform 110. The platform 110 has a cylindrical cavity 112 for receiving the pivot pin 15.

The major components of the invention are illustrated in FIG. 5 as follows: (1) a horizontal frame 200; (2) an upright vertically extensible and retractable lift 100, which is centered on the top horizontal surface 210 of the frame 200, the lift being mounted perpendicularly to the frame 200; (3) a horizontal platform 110 attached at the top end of the vertical lift; (4) a pneumatically powered motor 300; (5) a drive shaft 400; (6) rear mounted drive wheels 500 & 505 for driving the trailer dolly; (7) 6 sprocket wheels and 3 endless chains for transmitting power from the pneumatically driven motor to the drive wheels; (8) a front handlebar assembly 600 and a steering castor 660, each mounted at opposite ends of a Y-shaped arm 620, which has a swivel connection for a pivot mounting to the front end 220 of the frame 200; (9) a hitch ball assembly 50 attached to and extending rearward from the vertical lift; and (10) a lift bracket 800.

FIG. 5 shows the environment in which the trailer dolly is routinely used. The trailer 20, which is in various stages of manufacture on an assembly line is moved sequentially along a grooved track 22. The steering castor 660 travels along the grooved track 22. The trailer has to be moved and stopped at various intervals along the assembly line in order to allow the workers to install the various components during the manufacturing process. The trailer dolly is shown in the loaded position in FIG. 5. The drive wheels 500 & 505 are touching the pavement 24 because of the load placed on the horizontal frame 200 by the front 10 of the fifth wheel trailer 20. Both drive wheels 500 & 505 have secured around their circumferences a tire-like band made of rubber and cords and having treads for increased traction. The gear train from the pneumatic motor 300 to the drive wheels 500 & 505 has extensive gearing reduction to allow the drive wheels to turn very slowly with a high amount of torque in order to pull the heavy travel trailer 20 coupled to the dolly.

When the trailer dolly is in the unloaded position and is to be maneuvered to another travel trailer and docked to it, the spring biased lift bracket 800 secured underneath the frame raises the rear of the frame 200 sufficiently off the pavement so that the rear drive wheels 500 & 505 are not touching the pavement 24 and do not create a drag and interfere with the maneuvering and docking of the empty dolly.

When the trailer dolly is in the unloaded position, the operator can easily manually move the trailer by operating the handlebar assembly 600 and the attached T-bar handle 610 which extends from it. The operator can push and pull the dolly and steer it into position by turning the T-Bar and assembly which has a Y-shaped arm 620 and swivel connection 680 underneath the frame 200 and which guides the steering castor. There is a rigid support post 615 welded on the top of and at the front 220 of the frame. The post is upright and parallel to the handlebar assembly 600. There is a horizontal linkage 618 interconnecting the assembly 600 and the post 615. The end of the linkage secured to the post is a swivel connection aligned above the swivel connection 680 to allow the assembly 600 to swivel to guide the dolly. The purpose of the linkage 618 and post 615 is to provide support for the handle assembly. The handlebar assembly can be turned to a vertical orientation relative to the post 600 when the dolly is stowed away.

The trailer dolly is initially jockeyed into position beneath the front portion of a fifth wheel trailer. The handlebar 605 includes a hand-operated valve regulator 638 to introduce pressurized air to the apparatus for raising the vertically extensible lift 100. A first air hose 632 connects the air supply outlet connection 225 from the air chamber to the air supply inlet connection 635 on the handlebar. The midsection of the air hose 632 has been cut away in the FIGURES for clarity. It is to be understood that the air hose 632 interconnects the outlet 633 and inlet 635 in actual operation. As an alternative, an outside pressurized air hose could be coupled with the inlet 635. Lever 638 is actuated to force pressurized air into the two vertically oriented side mounted pneumatic pistons 120 & 130. There is a second air hose 642 connecting the handlebar with both pneumatic pistons. The air hose 642 has a Y-shaped coupling 643 to supply both pistons simultaneously with pressurized air so that they both extend a like amount. In FIGS. 1,3-5, the midsection and Y-shaped coupling of the second air hose 642 have been deleted for clarity. The operator actuates lever 638 to introduce pressurized air into the 5 pneumatic pistons, which in turn will raise the lift 100 and the attached platform 110 so that the platform extends upwardly and docks with and mates with the swivel pin 15 on the coupling member 10 of the fifth wheel trailer 20. After the docking procedure has been completed, the operator releases the lever 638. It is to be understood that different types of fifth wheel trailers will have varying vertical dimensions between the pivot pin 15 and the pavement 24. The front support leg(s) 30 and attached castor 32 prevent the front portion of the fifth wheel trailer from tilting downward and contacting the ground when the trailer is in the uncoupled position. The overall height of the platform 110 in the present invention when it is not in the extended position is such that raising the platform 110 will likewise raise the front portion of the travel trailer a few inches so that the front leg(s) 30 and castor are slightly off the ground. However, some travel trailers have spring biased telescoping front support leg(s) so that the castor is always touching the ground. The spring's resistance to compression increases as it compresses to cause the spring to maintain the travel trailer at a relatively horizontal attitude when it is in the uncoupled at rest position.

After the platform and the fifth wheel trailer have been engaged and coupled, the operator can move the trailer dolly with the trailer in tow either in a forward or reverse direction by depressing another lever actuated regulator valve 630 which introduces a continuous but regulated flow of pressurized air into the pneumatic motor 300. A third air hose 324 interconnects the handlebar 605 with the motor. In FIGS. 1, 3-5, the midsection of the third air hose 324 is cut away for clarity in the drawings. The motor can rotate either clockwise or counterclockwise, depending upon the direction from which the pressurized air is introduced. In the embodiment illustrated, the motor rotates in one direction only - clockwise when facing the motor from the starboard right side 235 of the platform 200. As long as the lever 630 is depressed, the air motor will rotate. The air hoses and handlebar may be collectively referred to as air lines. There is a pull lever 700 vertically mounted to the left side of the frame. At the bottom of the lever is a linkage 710. In one embodiment, the linkage connects to bleeder valves in the lift to release the pressurized air in the lift to allow the lift to retract. In another version, the linkage connects to a brake for braking the dolly. The lever 700 then functions as a hand brake. The lever can be combined to form both functions of braking and bleeding the pressurized air from the lift mechanism. By pulling the linkage forward, the lift is lowered; by pushing the linkage rearward, the dolly is braked.

FIG. 5 clearly shows in cross section the horizontal frame 200 means illustrated as a horizontal frame having a top surface 210, a bottom 215, a front 220, a back 225, a left side, and a right side. As viewed from FIG. 4, the top plan view, the horizontal frame has a rectangular rear section 240 and a rectangular front section 245 which is smaller than the rear section. There is also a medially positioned hollow brace 246 incorporated with the front section 245. The hollow brace is transversely welded at one end to the rear section 240. The forward portion extends beyond the front section 245. The forward portion supports the handle assembly and steering castor 600. The frame can be hollowed out and welded to form an air tight sealed air chamber for holding pressurized or compressed air. In this embodiment, the air chamber has an air nipple or pneumatic coupler 230 so that it can be filled with pressurized air and can function as a self-contained air tank to eliminate the need for having pressurized air supplied from outside air supply hoses. The pressurized air in the chamber is used to raise and lower the extensible lift and also to operate the motor in order to power the trailer assembly forward and aft. There could also be a self-contained air tank mounted on the top surface 210 for storing compressed air. This could be in conjunction with or in place of the compressed air chamber integrated within the frame.

When an outside supply of pressurized air is readily available such as the typical situation along the assembly line in a travel trailer manufacturing plant, the outside pressurized air hose is usually kept coupled to the air nipple 230 to keep the air chamber continuously supplied with compressed air to eliminate the need to refill the chamber with compressed air as it becomes depleted.

In a less complicated embodiment, not illustrated, there is no on-board air tank, or air chamber. In that case the outside pressurized air hose is connected directly to the handlebar assembly 605, or directly to the air motor 300 and to the pneumatic lift 100. In yet another embodiment, there could be an air line connection directly to the lift 100, and air lines connecting the lift with the air motor. Various check valves and regulator valves could be placed appropriately to monitor and regulate the pressurized air.

The power train system will now be discussed in further detail. Mounted on the top surface 210 of the horizontal frame is a pneumatic motor 300. Within the pneumatic motor is a pneumatically rotatable shaft 310 having a concealed air vane at one end, and an exposed power sprocket wheel 320 at the other. By the introduction of a continuous flow of pressurized air into the motor 300 via the air hose 324 and the inline oiler, the pressurized air flows over the pneumatic vane rotating the rotatable shaft 310 at a high r.p.m. In a typical embodiment, the air motor 300 would have a four horsepower rating. Also illustrated and connected to the air motor is an in-line oiler 330 interconnecting the incoming air hose 324 and the pneumatic motor. The oiler is used to lubricate the air motor. The air hose 324 has its other end connected to the handlebar 605. The driving power sprocket wheel 320 attached to the rotatable shaft 310 could preferably be a 12 tooth No. 40 sprocket.

Mounted on the top 210 of the horizontal frame and rearward of the extensible lift 100 is the transversely positioned drive shaft 400. This is clearly illustrated in the rear view, FIG. 3. The drive shaft is raised and secured above the horizontal frame on casements 410. Above the casements are several journals referred to as power blocks 420, which secure the drive shaft 400 in position on the casements 410, but allow the drive shaft to rotate freely. The drive shaft includes a universal joint 405 and an intermediate driven plate sprocket wheel 430, concentrically positioned on the drive shaft and coplanar with the power sprocket wheel 320. The intermediate plate sprocket wheel 430 could be comprised of a 84 tooth No. 40 plate sprocket. Since the driving power sprocket wheel 320 and the driven intermediate sprocket wheel 430 are coplanarly aligned and both are on rotatable shafts 310 & 400, there is an endless roller chain 425 connecting the two which could be a number 40 roller chain having a 116 pitch. Whenever the pneumatically rotatable shaft 310 of the air motor 300 is concentrically rotated, the intermediate plate sprocket wheel is also concentrically rotated; however, at a much lower rotational speed because of the differences in the sizes of the toothed sprocket wheels 320 & 430. There is a 7 to 1 reduction between sprocket 320 and sprocket 430. The turning of the intermediate plate sprocket wheel 430 causes the transversely placed drive shaft 400 to also rotate a like amount, or the same number of degrees.

Proceeding on with the discussion of the power train, there are a pair of drive shaft sprocket wheels 435 & 440 secured to opposite ends of the drive shaft 400 for driving the wheels. The left one is referred to as the left drive shaft sprocket wheel 435 and the right one is referred to as the right drive shaft sprocket wheel 440. Both of these sprocket wheels could be a 10 toothed No. 40 sprocket. There is also an axle 510 having a left end and a right end and secured to and transversely positioned toward the back of the horizontal frame 200. The axle can be nonrotatable or rotatable at the option of the fabricator of the trailer dolly. If the axle is rotatable, then it has to be secured to the frame by appropriate bearings and journals or pillow blocks. There is a left drive wheel 500 concentrically secured to the left end of the axle. Positioned inboard of the left drive wheel is a corresponding left drive wheel sprocket wheel 520, which has a diameter somewhat less than the diameter of the left drive wheel. It is secured to the hub 515 of the drive wheel 500 so that both rotate as a unit. There is a cover plate 515 over the outside of the drive wheel 500. In a mirror image relationship, there is the right drive wheel 505 concentrically secured to the right end of the axle 510. There is a matching right drive wheel sprocket wheel 525 which has a diameter somewhat less than the diameter of the right drive wheel, and is also concentrically secured to the hub 522 of the wheel. Both drive wheel sprocket wheels 520 & 525 could be number 40 sprockets having 60 teeth apiece. The relatively small diameter left drive shaft sprocket wheel 435 is concentrically attached toward the left end of the drive shaft 400 and is coplanar with the left drive wheel sprocket wheel 520 secured to the drive wheel 500. There is an endless roller chain 540 interconnecting the left drive shaft sprocket wheel 435 and the left drive wheel sprocket wheel 520. This chain can be a No. 40 roller chain having 99 pitches. The relatively small diameter right drive shaft sprocket wheel 440, which is concentrically attached at the right end of the drive shaft, is also coplanar with the right drive wheel sprocket wheel 525 on the drive wheel 505. There is a cover plate 523 secured to the outside of the right drive wheel 505. There is an endless roller chain 550 interconnecting the right drive shaft sprocket wheel 440 and the right drive wheel sprocket wheel 525. This roller chain could be a number 40 roller chain having 99 pitches. There is a 6 to 1 reduction between the drive shaft and the drive wheels. There is a safety chain guard or protective shroud shown in hatched lines in FIGS. 1-5 mounted at either end of the axle, and there are also a left shroud and a right shroud which cover parts of the power train protecting the sprocket wheels, the endless chains between the drive shaft and the axle, and also protecting part of the drive wheel from the operator. As the intermediate plate sprocket wheel 430 rotates, the drive shaft, the pair of left and right drive shaft sprocket wheels 435 & 440 in turn rotate the left and right drive sprocket wheels 520 & 525 which in turn are each secured to the hubs of each left and right drive wheels 500 & 505. This extensive power train and gearing reduction results in both drive wheels 500 & 505 being rotatable at a very slow rate, but with a high amount of torque being applied to the drive wheels. The rotational speed of the power sprocket wheel 320 at the air motor can be increased or decreased, depending upon the flow of pressurized air to the air motor. The air motor shaft 310, the drive shaft 400, and the axle 510 are all aligned in a spaced parallel relationship with each other. If the option of a rotatable axle is included, then the drive wheel sprockets could be secured directly to the axle.

Figure 1:
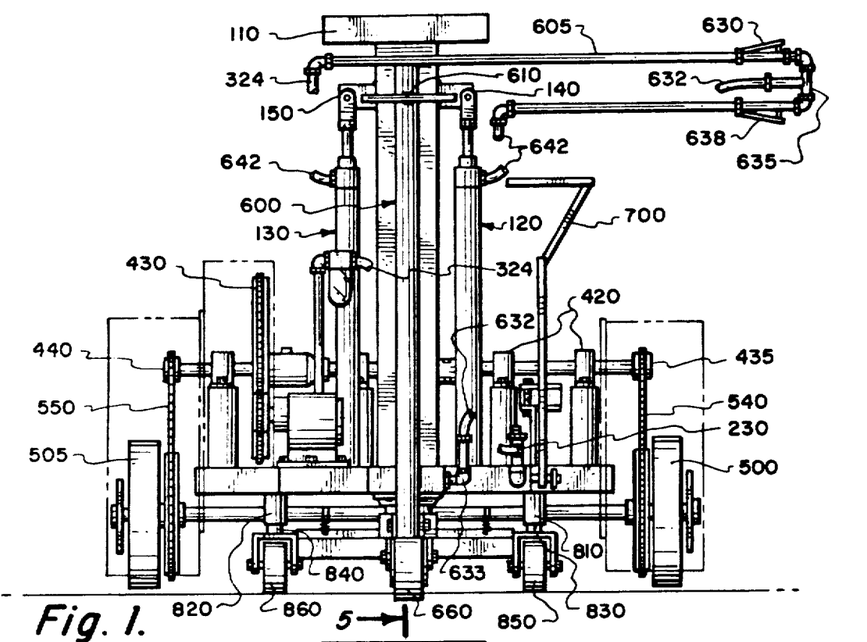
FIG. 1 is a front elevational view of the invention.
Figure 2:
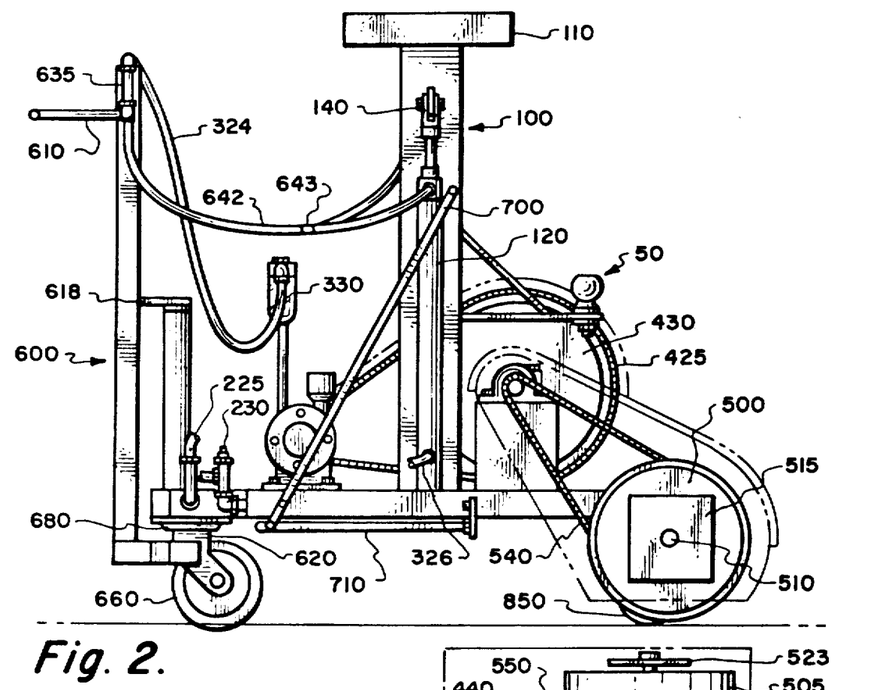
FIG. 2 is a right side elevational view of the invention.
Figure 3:
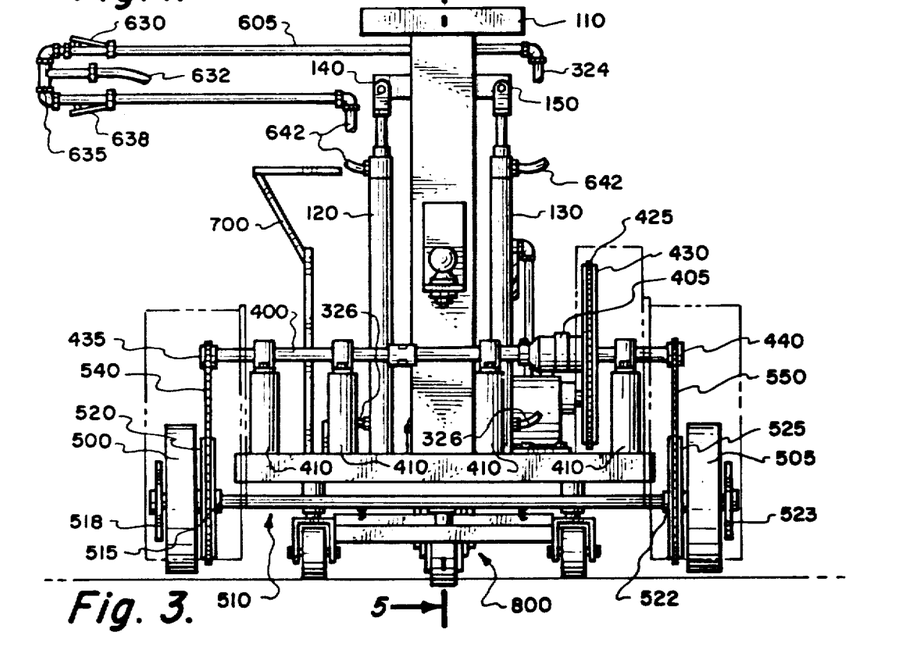
FIG. 3 is a rear elevational view of the invention.
Figure 4:
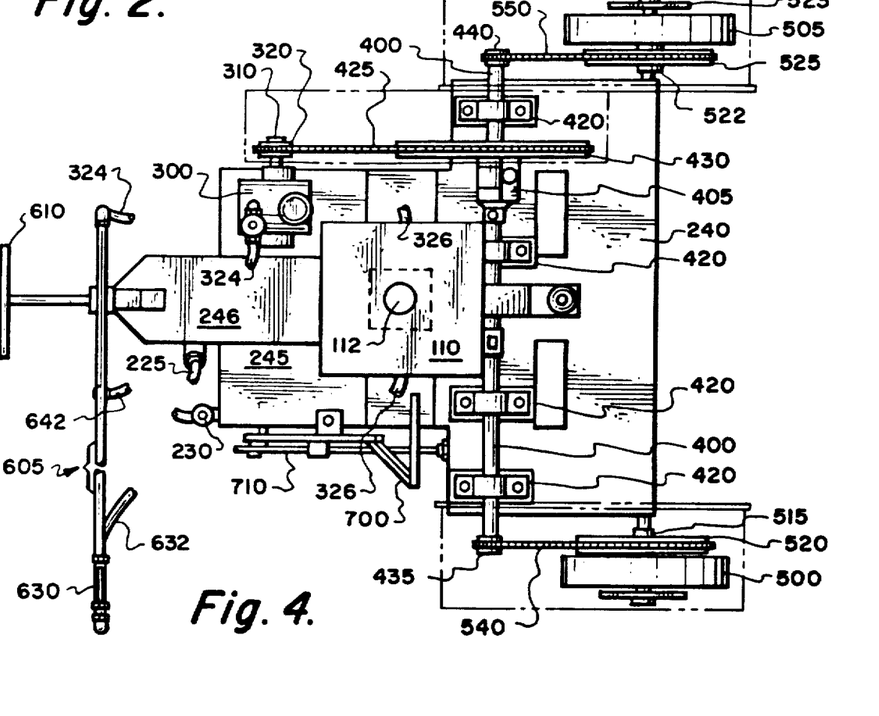
FIG. 4 is a top plan view of the invention.

FIGS. 1-3 illustrate the two side mounted pneumatic pistons 120 & 130 attached to the vertically extensible lift 100. In the embodiment illustrated, the major support lift is hollow and square in cross section. It rests upon a vertical guide post 105 for the extensible lift. The guide post is needed when the vertically extensible lift is elevated to contact the trailer. The vertical guide post will maintain the proper vertical alignment of the extensible lift. If the pneumatic pistons 120 & 130 are sturdily mounted to the lift and to the platform, the guide post is not necessary. In a modified version, a hole slightly larger than than the cross section of the lift could be cut into the platform 200 to allow the base of the lift to slideably extend below the platform. The hole would assist in maintaining the lift in a vertical attitude. The extensible lift is extended by the two side mounted telescoping pneumatic pistons 120 & 130 which are connected to the external brackets 140 & 150 on the lift and then secured to the top 210 of the platform 200. Each of the telescoping portions of the pneumatic pistons are secured to side support brackets 140 & 150 welded to the outer wall of the extensible lift. Each base of each pneumatic piston is fastened to the top side 210 of the horizontal frame so that both pneumatic pistons are vertically oriented and longitudinally parallel to the extensible lift. Additionally each pneumatic piston has an air hose, or air line from the Y-shaped coupling 643 at the air hose 642 connection so that the pressurized air can be introduced into each of the pneumatic pistons at the same time and in the same amount. The pneumatic pistons have an air supply hose 642 which is connected with the handle assembly 605 so that the manually operated lever 638 on the handle assembly can introduce pressurized air to the pneumatic pistons. There are bleeder hoses 326 extending from the base of each piston to release the pressurized air to retract the extended lift. The bleeder hoses 326 have been cut away in the drawings for clarity.

The extensible lift can be of a modified design in that the extensible lift and vertical guidepost function as if the component were a telescoping lift and pneumatically powered. In this embodiment the two side pneumatic pistons would not be required. The lift force would be caused by the air chamber and piston within the vertically extensible lift telescoping upwardly in response to the introduction of pressurized air into the air chamber integral with the pneumatic extensible lift.

The lift bracket 800 is always placed and secured to the underneath side of the basic platform. Extending from the underneath side of the platform are two transversly positioned hollow vertically oriented cylindrical slip joint receptacles 810 & 820 which mate with or cooperate with two upwardly extending smaller circular rods 830 & 840 on the bracket. These slip joint connections help support the bracket and the two castors 850 & 860 on the lift bracket. Each rod and hollow cylindrical receptacle are spring loaded such that they will expand a limited amount, causing the lift bracket to always keep both drive wheels raised above the ground whenever the trailer dolly is in the unloaded position. The weight of the front of the fifth wheel trailer forces the springs to compress, contracting the slip joints. Afterwards, both the left and right drive wheel will carry the load and contact the pavement with sufficient traction to provide motor power for the trailer dolly when in it is loaded with a trailer.

While the present invention has been shown and described herein in what is conceived to be the best mode contemplated, it is recognized that departures may be made therefrom within the scope of the invention which is therefore not to be limited to the details disclosed herein, but is to be afforded the full scope of the invention.

What is claimed is:

1. A trailer maneuvering dolly comprising:
   horizontal frame means having a top, a bottom, a front, a back, a left side, and a right side;
   drive wheel means attached to said frame means for driving the trailer maneuvering dolly;
   steering means attached to the front of said frame means for steering the trailer maneuvering dolly;
   motor means attached to said frame means for providing power to said drive wheel means;
   power train means interconnecting said motor means with said drive wheel means for transmitting power from said motor means to said drive wheel means;
   vertically extensible and retractable lift means attached to said top of said frame means and having a horizontal platform secured at it upper end for supporting the coupling member of a fifth wheel trailer;
   means for extending and retracting said vertically extensible lift means;
   lift bracket means for raising said back area of said dolly sufficiently to cause both said drive wheels to be raised off the ground whenever the trailer maneuvering dolly is uncoupled for allowing the dolly to be easily maneuvered by said support castors on said lift bracket and said steering castor at said front of said frame.

2. The trailer maneuvering dolly as recited in claim 1 wherein said means for extending and retracting said vertically extensible lift means comprises:
   at least one pneumatic piston having an upper end and a lower end and positioned longitudinally parallel to said vertically extensible lift means;
   said lower end of said pneumatic piston secured to said frame means;
   said upper end of said pneumatic piston secured to said vertically extensible lift;
   whenever pressurized air is introduced into said pneumatic piston, said upper end of said piston will extend upwardly thereby raising said extensible lift a like amount.

3. The trailer maneuvering dolly as recited in claim 1 wherein motor means attached to said frame means for providing power to said drive wheel means comprises:
   a pneumatically rotatable shaft having a pneumatic vane attached to said shaft;
   a rotatable power drive sprocket wheel concentrically attached to said shaft for transferring power from said rotating shaft to said power train means.

4. The trailer maneuvering dolly as recited in claim 1 wherein said drive wheel means attached to said frame means for driving the trailer maneuvering dolly comprises;
   an axle having a left end and a right end and secured to and transversely positioned toward said back of said horizontal frame means;
   a left drive wheel concentrically secured to said left end of said axle;
   a left drive wheel sprocket wheel having a diameter less than the diameter of said left drive wheel and concentrically secured to said left drive wheel;
   a right drive wheel concentrically secured to said right end of said axle;
   a right drive wheel sprocket wheel having a diameter less than the diameter of said right drive wheel and concentrically secured to said right drive wheel.

5. The trailer maneuvering dolly as recited in claim 1 wherein said drive wheel means attached to said frame means for driving the trailer maneuvering dolly comprises:
   an axle having a left end and a right end and secured to and transversely positioned toward said back of said horizontal frame means;
   a left drive wheel concentrically secured toward said left end of said axle;
   a left drive wheel sprocket wheel having a diameter less than the diameter of said left drive wheel and concentrically secured toward said left end of said axle;
   a right drive wheel concentrically secured to said right end of said axle;
   a right drive wheel sprocket wheel having a diameter less than the diameter of said right drive wheel and concentrically secured toward said left end of said axle.

6. The trailer maneuvering dolly as recited in claim 1 wherein said steering means attached to the front of said frame means for steering the trailer maneuvering dolly comprises:
   a Y-shaped arm extending from said bottom of said frame having a swivel connection for a pivot mounting at its base to said frame;
   a steering castor rotatably mounted to one end of said Y-shaped arm for supporting said front end of said frame and for steering said trailer maneuvering dolly;
   an upright handle assembly mounted at its lower end to said other end of said Y-shaped arm and extending ahead of said front of said frame;
   a T-bar handle mounted at the upper portion of said upright handle assembly for allowing the operator to change the direction of said castor by turning said T-bar handle thereby causing said Y-shaped arm to swivel relative to said frame;
   handle bar and hand-operated lever means mounted on the top of said upright handle assembly for regulating the flow and volume of pressurized air to the trailer maneuvering dolly; and
   pneumatic hose means interconnecting said motor means and said extensible lift means with said hand-operated lever means.

7. The trailer maneuvering dolly as recited in claim 1 further comprising a ball hitch assembly mounted on the dolly for coupling with a conventional tongue and sprocket trailer.

8. The trailer maneuvering dolly as recited in claim 1 wherein said means for extending and retracting said vertically extensible lift means comprises:
   an extensible and retractable upright post;
   pneumatic piston means for raising and lowering said upright post;
   a pivot point platform means attached to the top of said upright post for coupling with the coupling member of a fifth wheel type of trailer.

9. The trailer maneuvering dolly as recited in claim 1 wherein said means for extending and retracting said vertically extensible lift means comprises:
   an extensible and retractable upright post;
   pneumatic telescoping chamber means in said post for raising and lowering said upright post;
   a pivot point platform means attached to the top of said upright post for coupling with the coupling member of a fifth wheel type of trailer.

10. The trailer maneuvering dolly as recited in claim 1 wherein said means for extending and retracting said vertically extensible lift means comprises:
    a rigid vertical guide post mounted on said top of said frame;
    an extensible and retractable upright post having a hollow base for slideably engaging vertically with said rigid vertical guide post;
    pneumatic piston means for raising and lowering said upright post;
    a pivot point platform means attached to the top of said upright post for coupling with the coupling member of a fifth wheel type of trailer;
    a hitch ball assembly means attached to said upright post for hitching with the tongue and sprocket of a trailer.

11. The trailer maneuvering dolly as recited in claim 1 wherein said means for extending and retracting said vertically extensible lift means comprises:
    a rigid vertical guide post mounted on said frame, said frame having an opening for allowing the bottom of said post to pass through for assisting said post in maintaining a vertical attitude;
    pneumatic piston means for raising and lowering said upright post;
    a pivot point platform means attached to the top of said upright post for coupling with the coupling member of a fifth wheel type of trailer;
    a hitch ball assembly means attached to said upright post for hitching with the tongue and sprocket of a trailer.

12. The trailer maneuvering dolly as recited in claim 1 further comprising;
    air chamber means in said frame for holding a supply of pressurized air to power the dolly.

13. A trailer maneuvering dolly comprising:
    horizontal frame means having a top, a bottom, a front, a back, a left side, and a right side;
    drive wheel means attached to said frame means for driving the trailer maneuvering dolly;
    steering means attached to the front said frame means for steering the trailer maneuvering dolly;
    motor means attached to said frame means for providing power to said drive wheel means;
    said motor means including:
       a rotatable motor shaft;
       a rotatable driving power sprocket wheel concentrically attached to said motor shaft for transferring power from said motor shaft to said power train means;
    power train means interconnecting said motor means with said drive wheel means for transmitting power from said motor means to said drive wheel means;
    said power train means including:
       an axle having a left end and a right end and secured to and transversely positioned toward said back of said horizontal frame means;
       a left drive wheel having a left drive wheel sprocket wheel, both being secured to said left end of said axle;
       a right drive wheel having a right drive wheel sprocket wheel, both being secured to said right end of said axle;
       a drive shaft having a left end and a right end and positioned transversely above said horizontal frame and rearward of said retractable lift;
       said drive shaft being positioned in a spaced parallel relationship with said axle and said motor shaft;
       said drive shaft being held in position by a plurality of pillow blocks and journals;
       said drive shaft having at least one universal joint;
       a relatively large diameter intermediate driven plate sprocket wheel concentrically secured to said dive shaft and coplanar with with said driving power sprocket wheel on said motor shaft;
       an endless roller chain interconnecting said intermediate driven plate sprocket wheel with said motor driving power sprocket wheel;
       a relatively small diameter left drive shaft sprocket wheel concentrically attached toward said left end of said drive shaft and coplanar with said left drive wheel sprocket wheel on said left drive wheel;
       an endless roller chain interconnecting said left drive shaft sprocket wheel and said left drive wheel sprocket wheel;
       a relatively small diameter right drive shaft sprocket wheel concentrically attached toward said right end of said drive shaft and coplanar with said right drive wheel sprocket wheel on said right drive wheel; and
       an endless roller chain interconnecting said right drive shaft sprocket wheel and said right drive wheel sprocket wheel;
    vertically extensible and retractable lift means attached to said top of said frame means and having a horizontal platform secured at its upper end for supporting the coupling member of a fifth wheel trailer;
    means for extending and retracting said vertically extensible lift means.

14. A trailer maneuvering dolly comprising:
    horizontal frame means having a top, a bottom, a front, a back, a left side, and a right side;
    drive wheel means attached to said frame means for driving the trailer maneuvering dolly;
    steering means attached to the front of said frame means for steering the trailer maneuvering dolly;
    motor means attached to said frame means for providing power to said drive wheel means;
    power train means interconnecting said motor means with said drive wheel means for transmitting power form said motor means to said drive wheel means;

vertically extensible and retractable lift means attached to said top of said frame means and having a horizontal platform secured at its upper end for supporting the coupling member of a fifth wheel trailer;

means for extending and retracting said vertically extensible lift means;

lift bracket having support castors and positioned underneath said bottom of said frame and positioned transversely to and towards said back of said frame;

said support castors always touching the ground and maintaining a certain clearance between the ground and the bottom of said frame whenever said trailer dolly is in the uncoupled mode;

spring means positioned between said lift bracket and said bottom of said frame for raising said back of said frame off the ground when said dolly is in the uncoupled mode;

said lift bracket being used to raise said back area of said dolly sufficiently to cause both said drive wheels to be raised off the ground whenever the trailer maneuvering dolly is uncoupled for allowing the dolly to be easily maneuvered by said support castors on said lift bracket and said steering castor at said front of said frame.

* * * * *